United States Patent
Otomaru

(10) Patent No.: US 8,711,430 B2
(45) Date of Patent: Apr. 29, 2014

(54) DATA PROCESSING SYSTEM, DATA PROCESSING METHOD, AND IMAGE FORMING APPARATUS

(75) Inventor: Tomoko Otomaru, Machida (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 442 days.

(21) Appl. No.: 13/049,736

(22) Filed: Mar. 16, 2011

(65) Prior Publication Data

US 2011/0235070 A1 Sep. 29, 2011

(30) Foreign Application Priority Data

Mar. 26, 2010 (JP) ................................. 2010-072589

(51) Int. Cl.
*H04N 1/60* (2006.01)
*G06K 15/02* (2006.01)

(52) U.S. Cl.
USPC ............................ 358/1.9; 358/1.18; 358/450

(58) Field of Classification Search
USPC .......... 358/1.9, 1.15, 2.1, 1.2, 1.13, 1.18, 450
See application file for complete search history.

(56) References Cited

U.S. PATENT DOCUMENTS

| | | | |
|---|---|---|---|
| 7,325,721 B2* | 2/2008 | Autio et al. | 705/30 |
| 2003/0182203 A1* | 9/2003 | Kumakawa et al. | 705/26 |
| 2006/0253348 A1* | 11/2006 | Autio et al. | 705/29 |
| 2007/0211278 A1 | 9/2007 | Saito | |
| 2010/0073706 A1* | 3/2010 | Chan | 358/1.15 |
| 2010/0157362 A1* | 6/2010 | Oomura | 358/1.15 |

FOREIGN PATENT DOCUMENTS

JP 2007-237644 A 9/2007

* cited by examiner

*Primary Examiner* — Kimberly A Williams
(74) *Attorney, Agent, or Firm* — Buchanan Ingersoll & Rooney PC

(57) ABSTRACT

The data processing apparatus according to the present invention has the image data preparation unit that prepares various kinds of image data deriving from document data depending on various purposes of the document data; and the image synthesis instructing unit that instructs images to be synthesized based on the image data comprising a plurality of page portions on one sheet of paper for at least one kind of image data prepared by the image data preparation unit from various kinds of document data.

7 Claims, 15 Drawing Sheets

FIG.10

Carbon Copy Print Setup    501

Carbon copy 1
Output Tray
[Output Tray1 ∨]

Job Property
○ Linkage
[Carbon copy 1 ∨]

⦿ Individual specification
[Job Property]

Carbon copy 2
Output Tray
[Output Tray2 ∨]

Job Property
○ Linkage
[Carbon copy 1 ∨]

⦿ Individual specification
[Job Property]

Carbon copy 3
Output Tray
[Output Tray3 ∨]

Job Property
○ Linkage
[Carbon copy 1 ∨]

⦿ Individual specification
[Job Property]

[Cancel]  [Apply]  [Print]

FIG.12

| Job number | Paper output tray | N-up Layout | Duplex | Staple | ... | Carbon copy | Carbon copy pattern | Background color | Text to be inserted | Position to be inserted | ... |
|---|---|---|---|---|---|---|---|---|---|---|---|
| 001 | Automatic selection | 1-up | Off | Off | ... | No | — | — | — | — | ... |
| 002 | Paper output tray 1 | 1-up | Off | Off | ... | Yes | Original | Same as doc | None | — | ... |
| 002 | Paper output tray 2 | 1-up | Off | Center | ... | Yes | Copy | Yellow | None | — | ... |
| 002 | Paper output tray 1 | 1-up | Off | Off | ... | Yes | Copy | Same as doc | None | — | ... |
| 003 | Paper output tray 2 | 2-up | Left Binding | Left Binding | ... | Yes | Copy | Blue | For processing | X=50, Y=50 | ... |
| 003 | Paper output tray 3 | 4-up | Off | Off | ... | Yes | Copy | Same as doc | Copy | X=50, Y=50 | ... |
| 004 | Paper output tray 1 | 1-up | Top Binding | Top Binding | ... | No | — | — | — | — | ... |
| ... | ... | ... | ... | ... | ... | ... | ... | ... | ... | ... | ... |

FIG.14
Client copy
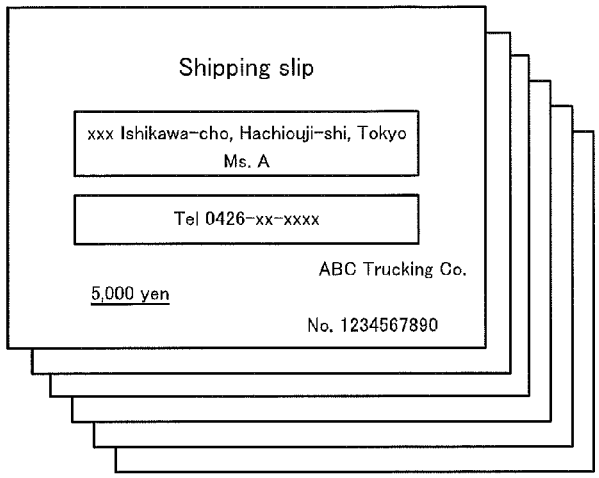
For processing
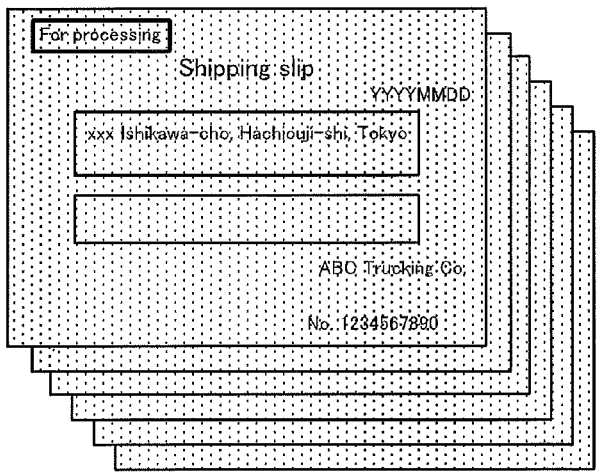
For filing
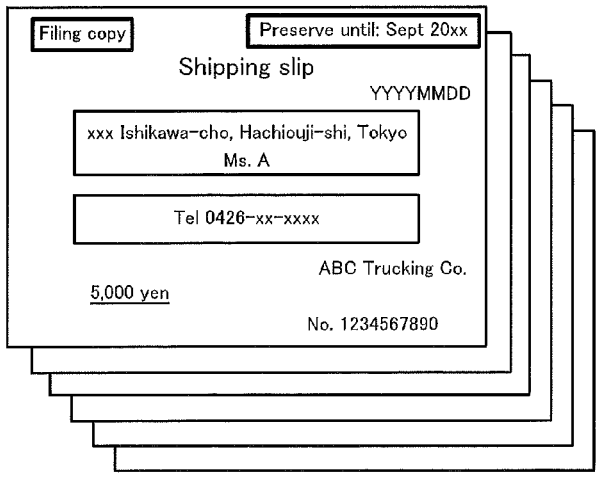

FIG.15 ent is equipped with a PC (personal computer) 100 as a
DATA PROCESSING SYSTEM, DATA PROCESSING METHOD, AND IMAGE FORMING APPARATUS

CROSS-REFERENCE TO RELATED APPLICATION

This application is based on Japanese Patent Application No. 2010-072589, filed on Mar. 26, 2010, the contents of which are incorporated herein by reference.

BACKGROUND

1. Technical Field

The present invention relates to a data processing system, a data processing method, and an image forming apparatus, in particular, for carbon copy printing.

2. Description of Related Art

In a service business such as the door-to-door package delivery service business, a plurality of physical copies, e.g., client's copy, processing copy, and filing copy, are often produced. In recent years, carbon copy printing has come to be known in that the same technology is applied to the electronic printing process as well.

As a technology of carbon copy printing, there is one that produces a color print for client's filing and a monochromatic print for processing or record filing from the original document data.

See Japanese Patent Publication No 2007-237644.

This printing technology enables one to reduce the number of color printing, hence reduce the consumption of the developing agent.

However, although the aforementioned technology can save the consumption of the developing agent by producing carbon copies for processing or record filing purposes in monochromatic prints, it does not allow one to save the quantity of the output paper as it does not process the print data in such a way as to reduce the quantity of the output paper.

The present invention was made to solve the aforementioned problem and it is an intention of the present invention to provide a data processing system, a data processing method, and an image forming apparatus for reducing the quantity of output paper.

SUMMARY

To achieve at least one of the above objectives, the data processing system reflecting an aspect of the present invention comprises an image data preparation unit and an image synthesis instruction unit. The image data preparation unit prepares various kinds of image data deriving from document data depending on varying purposes of said document data. The image synthesis instructing unit instructs images to be synthesized based on said image data comprising a plurality of page portions onto one sheet of paper for at least one kind of image data prepared by said image data preparation unit from said various kinds of document data.

It is preferable that said image synthesis instructing unit in the above data processing system to instruct to synthesize said image comprising plurality of page portions of the same kind onto one side or at least one of two sides of a page.

The above-mentioned data processing system further comprises an image forming unit that forms images on printing paper. It is preferable that said image synthesis instructing unit in the above data processing system to instruct said image forming unit to synthesize an image based on image data comprising a plurality of page portions onto a single page of a sheet of paper.

It is preferable that said image synthesis instructing unit in the above data processing system to instruct said image data preparation unit to prepare synthetic image data synthesized from a plurality of images of the same kind onto one side of said single page.

It is preferable that said image data preparation unit in the above data processing system to prepare image data depending on purposes of said document data by at least one process among the processes of adding or deleting texts, masking a portion of texts, modifying the background color, and synthesizing other image data.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 10 is a diagram showing an example of a print setup screen.

FIG. 12 is a diagram showing an example of setup information to be set up with respect to image data of a carbon copy.

FIG. 14 is a diagram showing a concept of the image data prepared for printing.

FIG. 15 is a diagram showing how the image data prepared for printing is further synthesized.

DETAILED DESCRIPTION

The embodiment of this invention will be described below with reference to the accompanying drawings.

Figure 1:
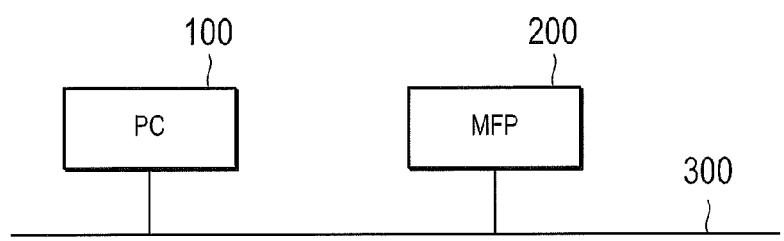
FIG. 1 is a block diagram showing the overall constitution of a printing system according to an embodiment of the present invention.

FIG. 1 is a block diagram showing the overall constitution of a printing system according to a first embodiment of the present invention. The printing system of the present embodiment is equipped with a PC (personal computer) 100 as a network terminal and an MFP (Multi-Function Peripheral) 200, both of which are connected via a network 300 to be able to communicate with each other.

The network 300 can be a LAN connecting computers and network equipment in compliance with standards such as Ethernet, Token Ring, and FDDI, or a WAN that consists of several LANs connected by a dedicated line. The types and the number of equipment to be connected to the network 300 are not limited to those shown in FIG. 1. Also, the PC 100 and the MFP 200 can be connected directly (locally connected) without recourse to network 300.

Figure 2:
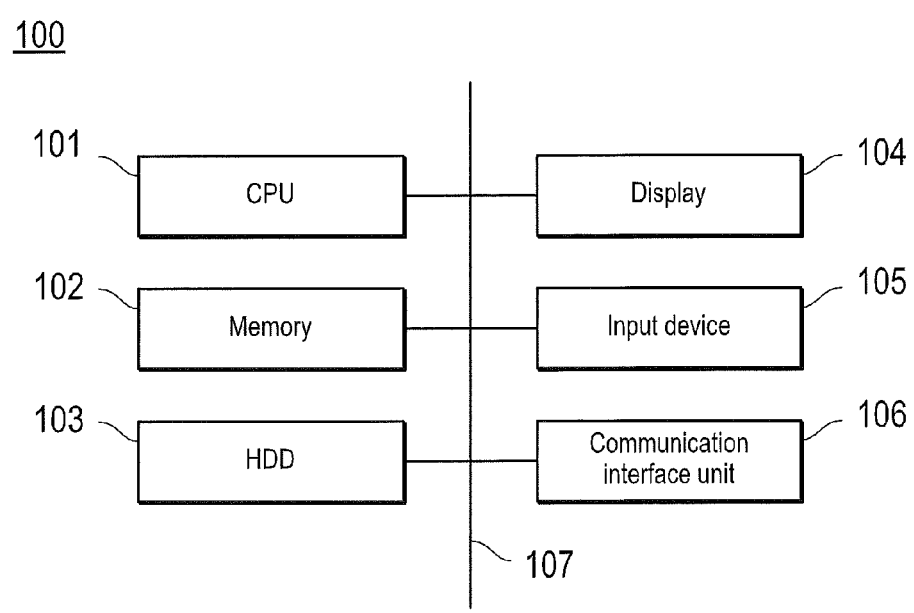
FIG. 2 is a block diagram showing the constitution of the PC shown in FIG. 1.

FIG. 2 is a block diagram showing the constitution of the PC 100 shown in FIG. 1. The PC 100 is provided with a CPU 101, a memory 102, an HDD (Hard Disk) 103, a display 104, an input device 105, and a communication I/F (interface) unit 106, all of which are interconnected by a bus 107 for exchanging signals.

The CPU 101 controls various units mentioned above (e.g., instructing an image synthesis) and various arithmetic processes (e.g., image forming process) according to programs.

The memory 102 comprises a ROM for storing various programs and various kinds of data, and a RAM which functions as a work area for temporarily storing programs and data. Also, the memory 102 can be constituted, for example, of DRAM (Dynamic Random Access Memory).

The HDD 103 stores various programs including an operating system and various kinds of data. The HDD 103 has various kinds of applications installed for preparing, selecting and reproducing document data or preparing and setting up image data (also referred to as "printing data") based on original document data. Also, there is installed a printer driver for converting the prepared image data into PDL data described in a page description language (PDL) that can be interpreted by the MFP 200. The HDD 103 stores various kinds of image data prepared based on the original document data, and such stored image data can be retrieved onto the memory 102 and processed on the memory 102 by the CPU 101.

The display 104 can be LCD, CRT, etc., on which various kinds of information are displayed. The input device 105 includes a pointing device such as a mouse, a keyboard, etc., and is used for entering various kinds of information.

The communication I/F unit 106 is an interface for communicating with external equipment, and can be a network interface based on a standard such as Ethernet, Token Ring, and FDDI, a serial interface such as USB and IEEE 1394, a parallel interface such as SCSI and IEEE 1284, a wireless communication interface such as BLUETOOTH (trademark), IEEE 802.11, HomeRF, and IrDA, a telephone circuit interface for connecting to telephone circuits, etc.

Figure 3:
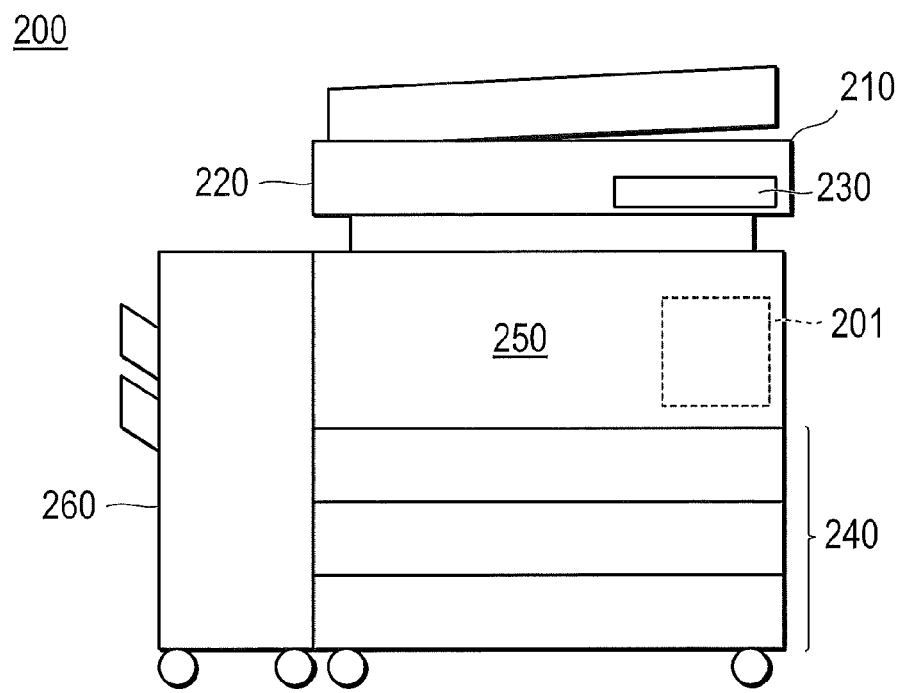
FIG. 3 is a schematic diagram showing the constitution of a front side of the MFP shown in FIG. 1.

FIG. 3 is a schematic diagram showing the constitution of a front side of the MFP 200 shown in FIG. 1. The MFP 200 according to the present embodiment is equipped with a control unit 201, an ADF (Automatic Document Feeder) 210, an image scanning unit 220, an operating unit 230, a paper supply unit 240, an image forming unit 250, and a paper output unit 260. These units are interconnected for exchanging signals via a bus.

The ADF 210 transports a preset single or multiple sheets of paper of a document one sheet at a time to a specified scanning position of the image scanning unit 220, and outputs the document sequentially after scanning it.

The image scanning unit 220 irradiates a document, which is set on the specified scanning position or transported to the specified scanning position by the ADF 210, with a light source such as a fluorescent lamp and the like, then converts the reflected lights from the document surface into electrical signals with the imaging devices such as a CCD image sensor, and generates image data from the electrical signals.

The operating unit 230 is equipped with a touch panel, a ten-key pad, a start button, a stop button and others to be used for displaying various data and entering various instructions.

The paper supply unit 240 stores printing paper as a recording medium used for printing, and sends forward the stored paper one sheet at a time to the image forming unit 250. The paper supply unit 240 consists of a plurality of sections so that paper size, color and paper quality can be selected in accordance with the purpose of printing.

The image forming unit 250 prints images based on various kinds of data on paper by using a known imaging process such as the electronic photographic process including such processes as electrical charging, exposing, developing, transferring, and fixing.

The paper output unit 260 outputs the paper transferred from the image forming unit 250 after adding a finishing process the user desires, based on the instruction of the control unit 201. The finishing process includes a stapling process for stapling a bundle of paper, a punching process for punching holes at paper edges for filing purpose, a bookbinding process for binding in a form of a book, a folding process for folding paper, and a trimming process for trimming edges of paper. Alternatively, the paper output unit 260 can be a unit for simply letting out paper without any finishing processes. Furthermore, the paper output unit 260 has a plurality of paper output trays and allows a paper output tray to be assigned for each finishing process corresponding to each printing purpose.

Figure 4:
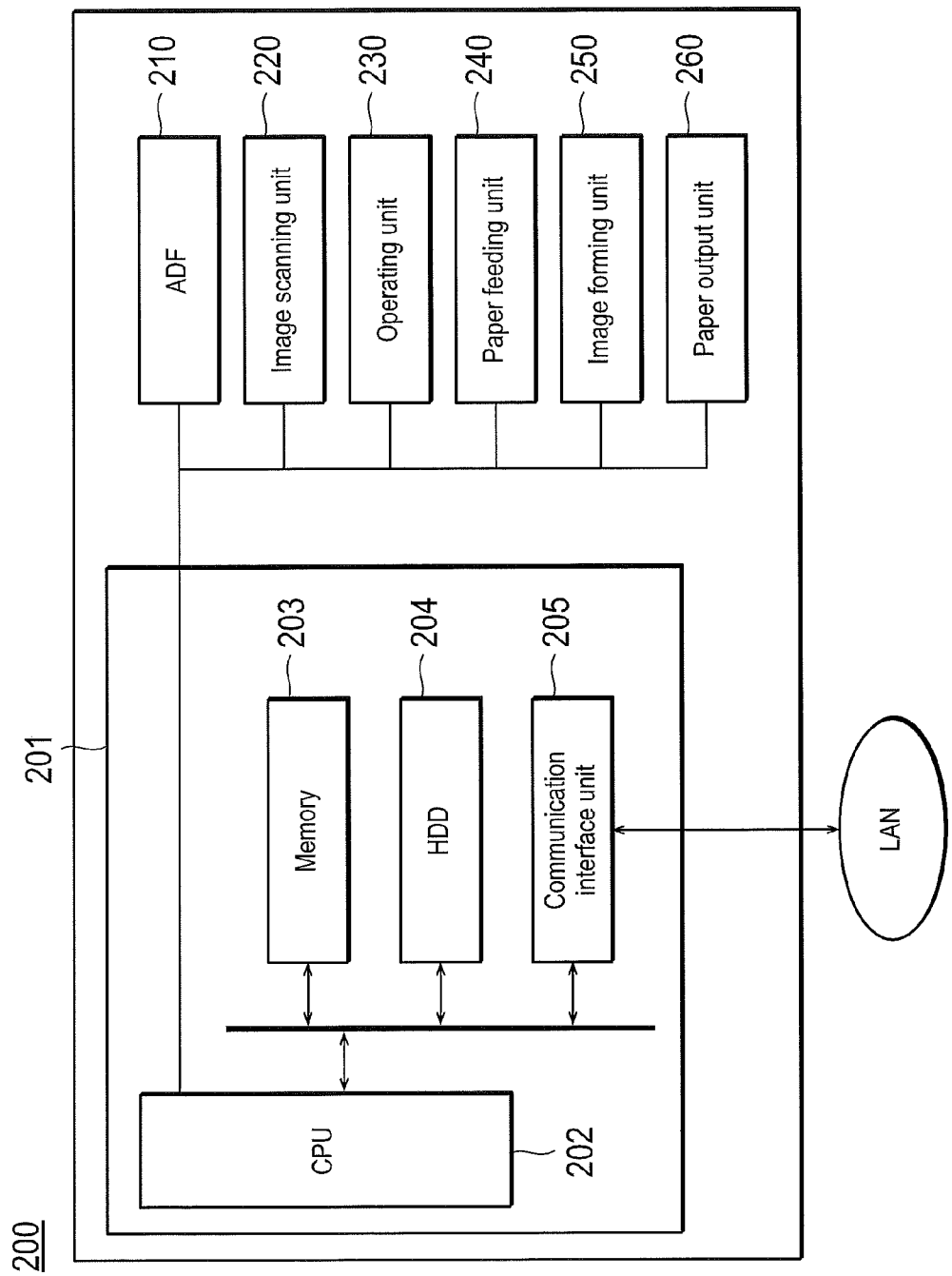
FIG. 4 is a block diagram showing the constitution of the MFP shown in FIG. 1.

FIG. 4 is a block diagram showing the constitution of the MFP 200 shown in FIG. 1. The control unit 201 comprises a CPU 202, a memory 203, an HDD 204, and a communication I/F unit 205. These units are interconnected for exchanging signals via a bus. The descriptions of those parts of the MFP 200 that have the same functions as those of the corresponding parts of the PC 100 will be omitted herein to avoid duplication.

The CPU 202 is in charge of controlling various units mentioned above or various kinds of arithmetic processes (e.g., image synthesizing processes).

The HDD 204 stores various programs including an operating system and various kinds of data. The HDD 204 stores a program for translating PDL data received from the PC 100 in order to generate bitmap type image data, as well as a program for forming images by editing, fabricating, or synthesizing the bitmap type image data.

The communication I/F unit 205 is an input/output device for transmitting/receiving data via a LAN (Local Area Network) to or from the PC 100. That is, the input/output device 205 is in charge of data transmission and reception using various network protocols by establishing connections with the PC 100.

The PC 100 and the MFP 200 can each contain constitutional elements other than those described above, or may not comprise a portion of the above elements.

The procedure of preparing and setting up a carbon copy will be described with reference to FIGS. 5 through 13.

Figure 5:
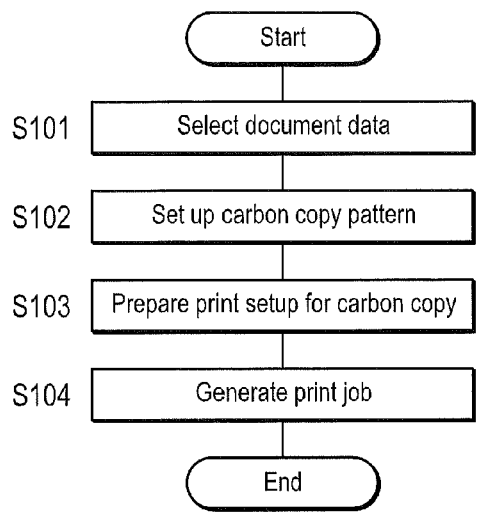
FIG. 5 is a flowchart showing a setting procedure for setting up a carbon copy pattern according to the present embodiment.
Figure 6:
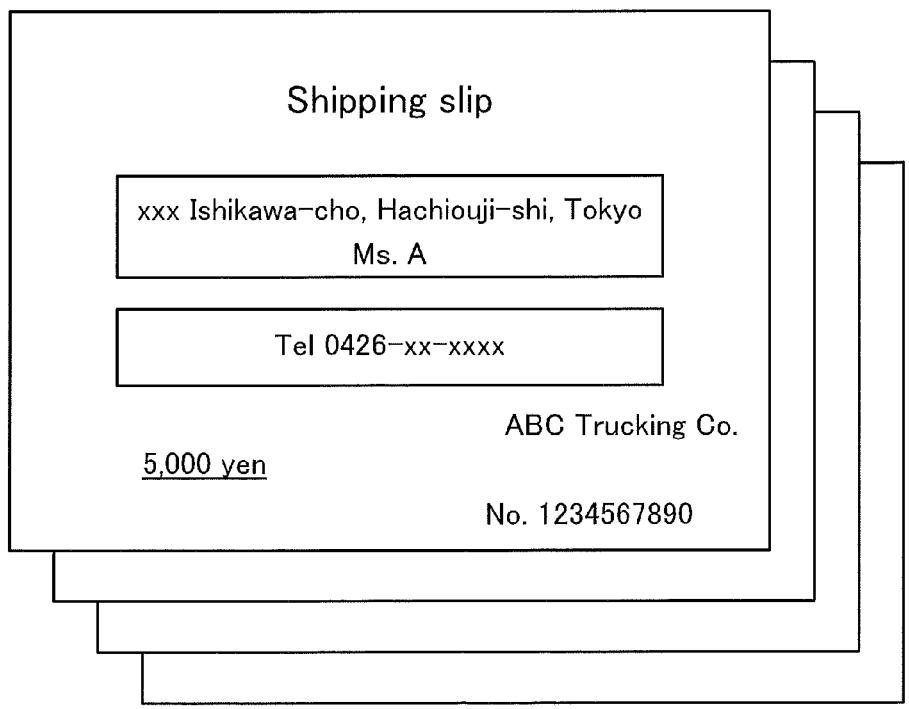
FIG. 6 is a diagram showing an example of original document data.

FIG. 5 is a flowchart showing a setting procedure for setting up a carbon copy pattern according to the present embodiment, and FIG. 6 is a diagram showing an example of document data.

In the present embodiment, the original document data is first selected as an objective for preparing a carbon copy pattern (step S101). The selection of the document data here refers to, for example, a process of the user's selecting document data to be read onto a specified application. The original document data is the document data prepared in advance on the PC 100 or other devices, which is stored in the memory 102 or the HDD 103 of the PC 100. The original document data is the data for expressing a single document or a document consisting of a plurality of sheets. Alternatively, the original document data can be selected by scanning a document with the ADF 210.

The original document data is, for example, as shown in FIG. 6, document data for expressing a document such as a shipping slip containing such information as a document name, a destination, the destination's telephone number, a company name, an amount of money, a control number, etc. Such document data can be prepared by the user's entering data in a desired format on a specific application. There are various applications used for preparing document data such as, for example, the Microsoft Word®, Excel®, PowerPoint®, or a special-purpose application. Such an application is installed in the PC 100, and its input data is entered by the user using a specified input equipment.

Figure 7:
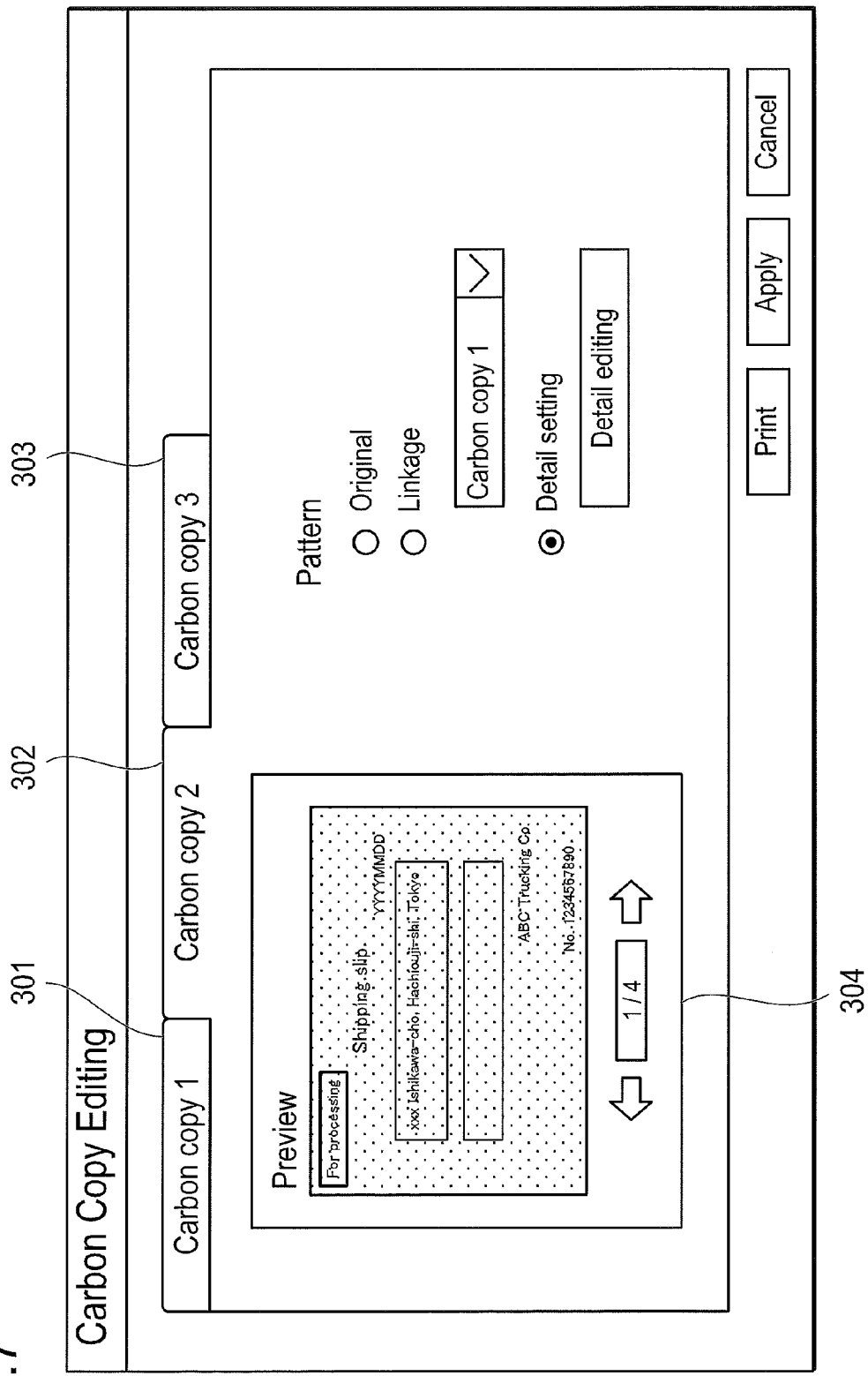
FIG. 7 is a diagram showing an example of a screen for preparing or setting image data.
Figure 8:
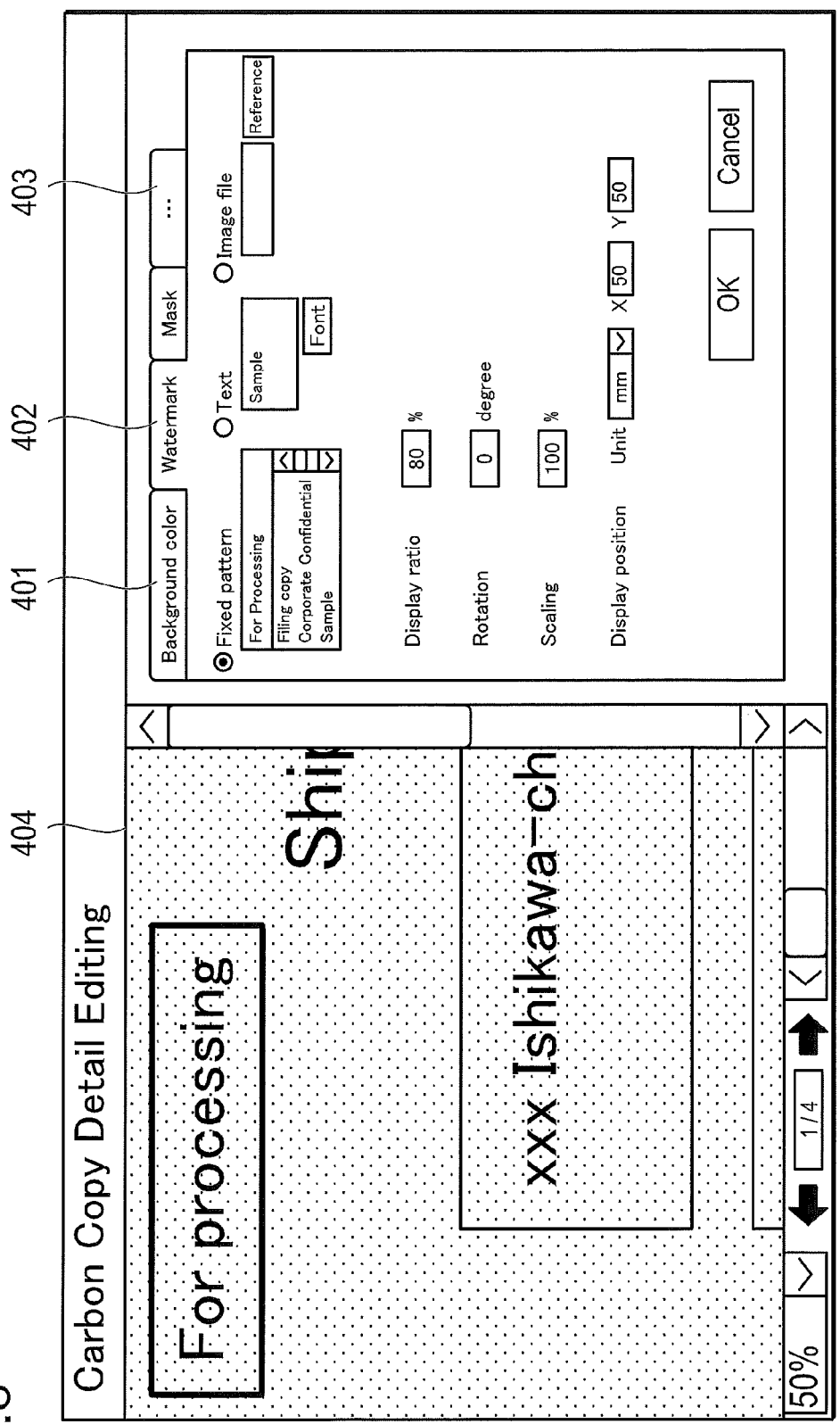
FIG. 8 is a diagram showing an example of a screen for preparing or setting image data.
Figure 9:
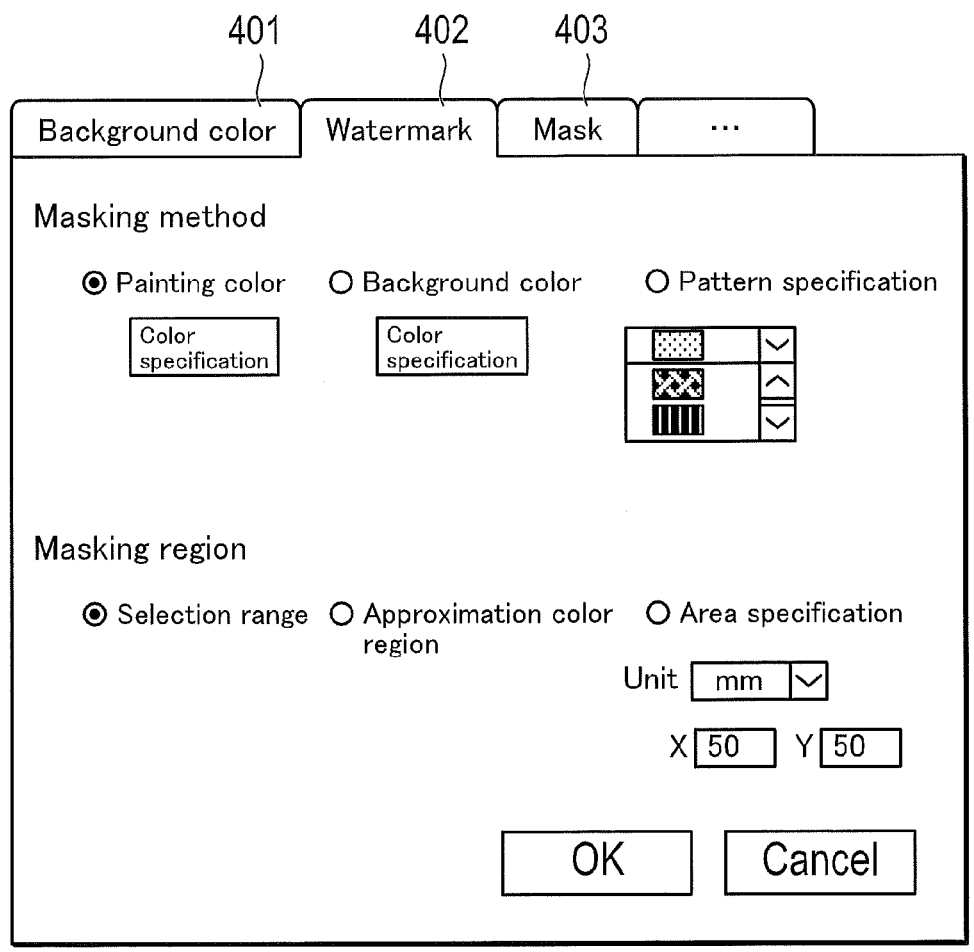
FIG. 9 is a diagram showing an example of a screen for preparing or setting image data.

Next, the PC 100 receives the setting about the carbon copy pattern from the user with respect to the selected document data via the printer driver's setup screen and sets up a desired type of carbon copy pattern (step S102). During this process, the user prepares various kinds of settings while looking at the setup screens as shown in FIGS. 7 through 9 (to be described later) on the display 104. For example, the user can prepare a carbon copy pattern by adding or deleting specified texts in accordance with the purpose of the carbon copy. Also, the user can prepare a carbon copy pattern by masking a portion of the original document data, and further execute various processes, e.g., a process of modifying the background color, a process of synthesizing other image data, etc. The details will be described later.

Figure 11:
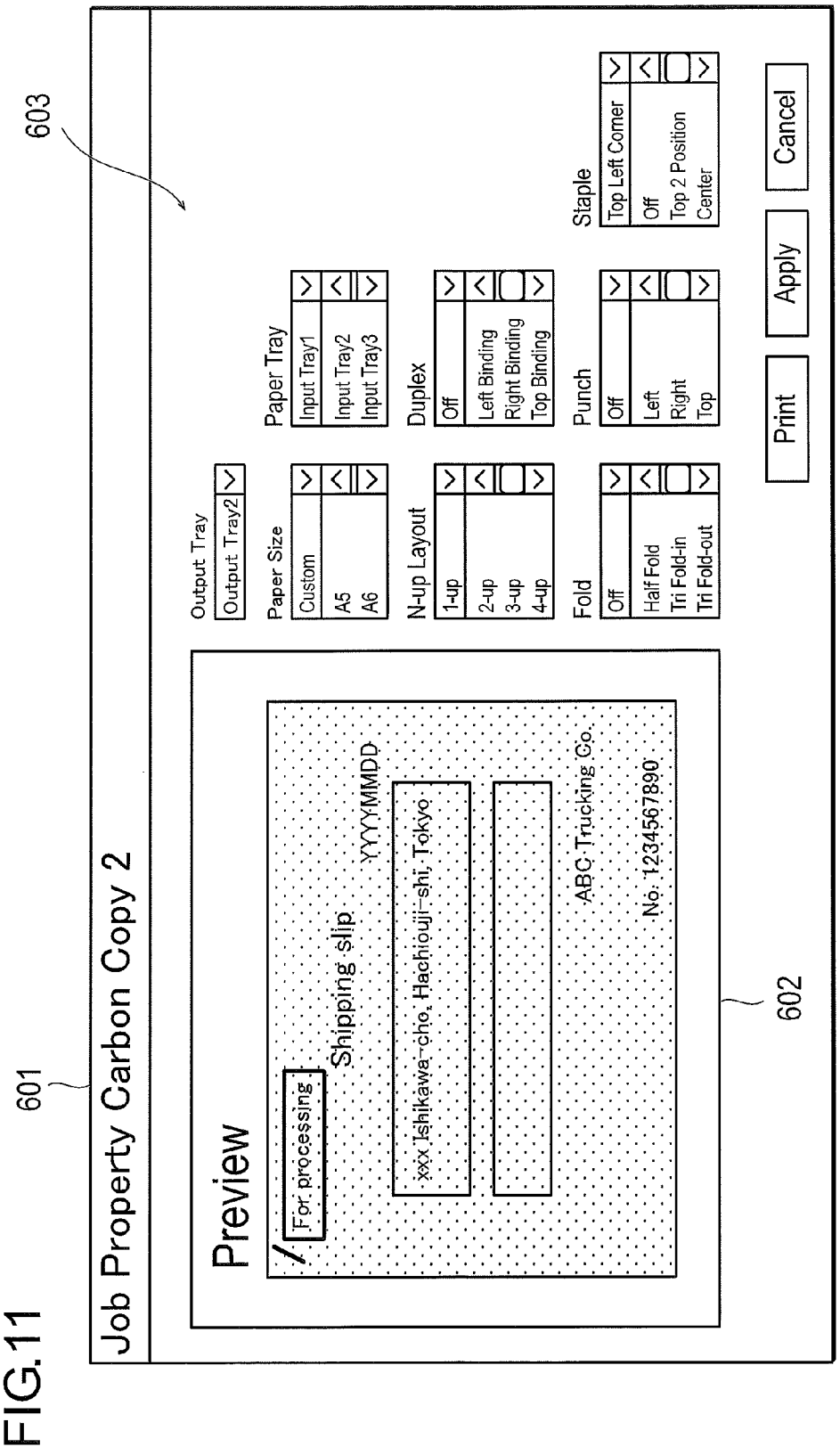
FIG. 11 is a diagram showing an example of a print setup screen.

Next, the PC 100 receives printing setup information for carbon copies intended for paper saving (step S103). During this process, the user prepares various kinds of settings while looking at the setup screens as shown in FIGS. 10 and 11 (to be described later). For example, the user can set up the N-in-1 printing in which images in multiple page portions are to be printed on one side of a page, or the double-sided printing (Duplex printing) in which images are synthesized on both sides of paper. The details will be described later.

The PC 100 prepares a print job in accordance with the above settings (step S104).

(Setting of Carbon Copy Pattern)

Various kinds of settings for a carbon copy pattern in the step S102 are described below in detail.

FIG. 7 is a diagram showing an example of an editing screen (printer driver setup screen) for a carbon copy, FIG. 8 is a diagram showing an example of a detail editing screen (printer driver setup screen) for a carbon copy, and FIG. 9 is a diagram showing an example of a detail editing screen (printer driver setup screen) for a carbon copy.

In order to set up a carbon copy pattern about an original document data, first, a printer driver setup screen is activated by the application that displays the selected original document data. The setup screen for the printer driver is displayed on the display 104 as shown in FIGS. 7 through 9.

As shown in FIG. 7, the "carbon copy" editing screen has a plurality of tabs 301 through 303 corresponding to each carbon copy pattern (Carbon copies 1 through 3 in the figures shown) the user desires. By selecting the tabs 301-303, the screen is switched so that each carbon copy pattern can be edited. The switched screen 302, is provided with a preview screen 304 so as to allow the user to check the result of the editing of the carbon copy pattern. The editing screen of the carbon copy is provided with various buttons such as "Print," "OK," and "Cancel," option buttons as well as pull-down menus for selectively editing carbon copy patterns, or "detail editing" buttons for editing carbon copy patterns in more detail, etc.

The tabs 301-303 are provided as many as the number of carbon copy patterns. That is, the user can prepare as many carbon copy patterns as desired, and the tab screens can be constituted as many as the number of these carbon copy patterns. The user can select one of the tabs 301-303 of the desired carbon copy patterns to edit the desired carbon copy pattern via the corresponding tab screens. For example, the edit screen shown in FIG. 7 is the screen for setting up the second carbon copy pattern ("Carbon copy pattern 2"). The user can check on the display 104 the image to be printed on paper assuming that the printing is performed based on the current setup via the preview screen displayed on the left side of the tab screen 302.

As shown in FIG. 7, on the right side of the preview screen 304 in the screen 302, option buttons for selectively setting the "pattern" of the carbon copy are constituted. With this option button being selected, a desired pattern can be selected. For example, if the item "Original" is selected, the carbon copy pattern 2 is set up with the desired carbon copy pattern which is stored as "Original" in advance. If the item "Linkage" is selected, an identical setting as the specified carbon copy can be set up by specifying one carbon copy from the list of the other carbon copies shown in the pull-down menu.

If the "Detail Editing" button is pressed down, the "Carbon Copy Detail Editing" screen is displayed as shown in FIG. 8. This detail editing screen consists of a plurality of tabs 401-403 etc. for switching the detail editing screens depending on the image processing items and the screen 404 for previewing the image of the carbon copy pattern based on the current setting. The image processing items include, as shown in FIG. 8, "Background," "Watermark," and "Mask." These editing processes can be switched by selecting the corresponding tabs 401-403 etc. In the "Background Color" process, the user can prepare a carbon copy pattern with a modified background color from the original document and a new background color. In the "Watermark" process, the user can prepare a carbon copy pattern in which desired texts with a desired display rate (transmittance rate) can be added to the original document. In the "Masking" process, the user can prepare a carbon copy pattern in which a portion of the document is masked.

More specifically, as shown in FIG. 8, when the tab 402 of the "Watermark" process is selected, the screen consists of the option buttons, pull-down menus, text box, etc. If the item "Fixed Form" is selected, specific texts listed in the pull-down menu can be added. If the item "Text" is selected, an arbitrary text can be specified as a watermark. If the item "Image File" is selected, the image file stored in advance can be specified as a watermark. As additional settings for setting up a watermark, the settings such as "Display Ratio," "Rotation" angle, "Scaling" ratio, and "Display Position" can be used for specifying how the watermark specified as above should be displayed in terms of design.

Also, more specifically, as shown in FIG. 9, when the tab 403 is selected in the "Masking" pattern process, the switched screen 403 includes the items "Masking Method," and "Masking Region". The item "Masking Method" further includes the items "Painting color," "Background color," and "Pattern specification." Masking color, background color and pattern can be specified in the items "Painting color," "Background color," and "Pattern specification," respectively The item "Masking Region" further includes the items "Selection Range," "Approximation Color Region," and "Area Specification." In the item "Selection range," the masking range can be specified. In the item "Approximation color region," by specifying a region that includes a color close to the desired color to be set up, a color that appears in the indicated region can be specified. In the item "Area specification," the region to be masked can be specified by a numerical value. In the items "Selection range" and "Approximation color region," the user can specify the range of a region using the input device 105 such as the mouse.

As described above, the PC 100 can prepare a desired carbon copy pattern specified or edited by the user in accordance with the procedure shown in FIG. 5.

(Various Settings for Saving Paper Consumption)

Various kinds of settings for a carbon copy pattern in order to save paper consumption in the step S103 will be described in detail below.

FIG. 10 is a diagram showing an example of a carbon copy print setup screen, and FIG. 11 is a diagram showing an example of a more detailed print job setup screen for a carbon copy.

The print setup of a carbon copy is performed via the print setup screen shown in FIG. 10 for a carbon copy pattern as described above. The print setup screen is activated by a specific operation, e.g., pressing down the print setup button (not shown) for a carbon copy.

As shown in FIG. 10, the screen 501 "Carbon Copy Printing Setup" includes the items "Output Tray" and "Job Property." In the item "Output Tray," the output tray of the paper output unit 260 can be specified for outputting each carbon copy. In the item "Job Property," the print property can be specified for each carbon copy. The item "Job Property" includes the item "Linkage" for setting up the same print setup as another carbon copy pattern and the item "Individual Setting" for specifying a print setup for each carbon copy.

By pressing down the "Job Property" button in the item "Individual Setting," the print setup screen for a more detailed print setup is activated. For example, by pressing down the "Job Property" button of the "Carbon Copy 2," a "Job Property" screen 601 is activated for a more detailed print setup of the Carbon Copy 2 as shown in FIG. 11. The screen 601 includes a preview screen 602 and a various kinds of detail setup items 603.

In the preview screen 602, how the image looks after printing according to the setup of the detailed setup item 603 can be displayed. In the detailed setup item 603, as shown in FIG. 11, the "Output Tray" setting, "Paper Size" setting, "Paper Tray" setting, "N-up Layout" setting, "Duplex" setting, "Fold" setting, "Punch" setting and "Staple" setting can be adjusted.

In the "Output Tray" setting, a paper output tray can be specified to output the printed matter. In the "Paper Size" setting, a paper size can be specified. In the "Paper Tray" setting, which paper supply trays of the paper supply unit 240 to be used can be specified for supplying paper. In the "N-up Layout" setting, it is possible to specify to synthesize the n carbon copy images to which the Carbon Copy Pattern 2 was applied (the images of the same kind in multiple page portions) on one side of a single page of the printing matter. The "n" is an arbitrary natural number. In the "Duplex" setting, it is possible to specify to synthesize carbon copy images to which the Carbon Copy Pattern 2 was applied (the images of the same kind in multiple page portions) on both sides of a single page of the printing matter (duplex print). In the Fold" setting, a folding process can be specified. In the "Punch" setting, a hole punching process can be specified. In the "Staple" setting, a stapling process can be specified. Print setup for each carbon copy is performed by being specified by the user's setting each of those setup items. The print setup for each carbon copy pattern is set collectively as one print job in the setup S104.

FIG. 12 is a diagram showing an example of a print job.

The print job including the carbon copy setup information and the print setup information set as described above is stored in a lookup table as shown in FIG. 12. As shown in FIG. 12, the setup item and the print setup item set to the carbon copy are listed on the topmost row. The print jobs appear in the order they were stored after the second row and thereafter.

More specifically, in the example of FIG. 12, it can be seen that no carbon copy is set up for the job number "0001" ("Carbon Copy" setup item: 'No') and the "Paper Output Tray" is set up for 'Automatic Selection,' while all other setup items are set as default.

Also, it can be seen that the print job of the job number "0003" (hereinafter referred to as the print job "0003") is set up with three types of carbon copies ("Carbon Copy" setup item: 'Yes'). In the following, these carbon copies will be referred to as the Carbon Copy Patterns 1 through 3 in the order they appear from the top downward in the print job "0003." It can be seen that for the Carbon Copy Pattern 1, '1-up' (one image on one side of a sheet of paper) is set up for the "N-up Layout" setting, and the single side printing is specified ('Off' for the "Duplex" setting). In addition, it can also be seen that for the Carbon Copy Pattern 1, 'Paper Output Tray 1' is set up for the "Paper Output Tray," and 'Same as doc' (same as the original document data) is set up for the "Background Color" for the carbon copy among other settings.

It can be seen that for the Carbon Copy Pattern 2, '2-up' (two images on one side of a sheet of paper) is set up for the "N-up Layout" setting, and 'Left-Binding' (double-sided printing stapled on the left side) for the "Duplex" and "Stapling" settings. In addition, it can be seen that for the Carbon Copy Pattern 2, 'Paper Output Tray 2' is set and 'Blue' (blue background color) is set for "Background Color," 'For Processing' for the "Insertion Text," and 'X=50, Y=50' for the insertion position of the insertion text among others.

It can be seen that for the Carbon Copy Pattern 3, '4-up' (four images on one side of a sheet of paper) is set up for the "N-up Layout" setting, and the double-side printing is not specified. In addition, it can be seen that for the Carbon Copy Pattern 3, 'For Filing' for the "Insertion Text" and 'X=50, Y=50' for the insertion position of the text to be inserted are set up among others.

As described above, various settings are stored in the lookup table for each print job.

The procedure of preparing image data for printing from the print job prepared as above will be described below.

Figure 13:
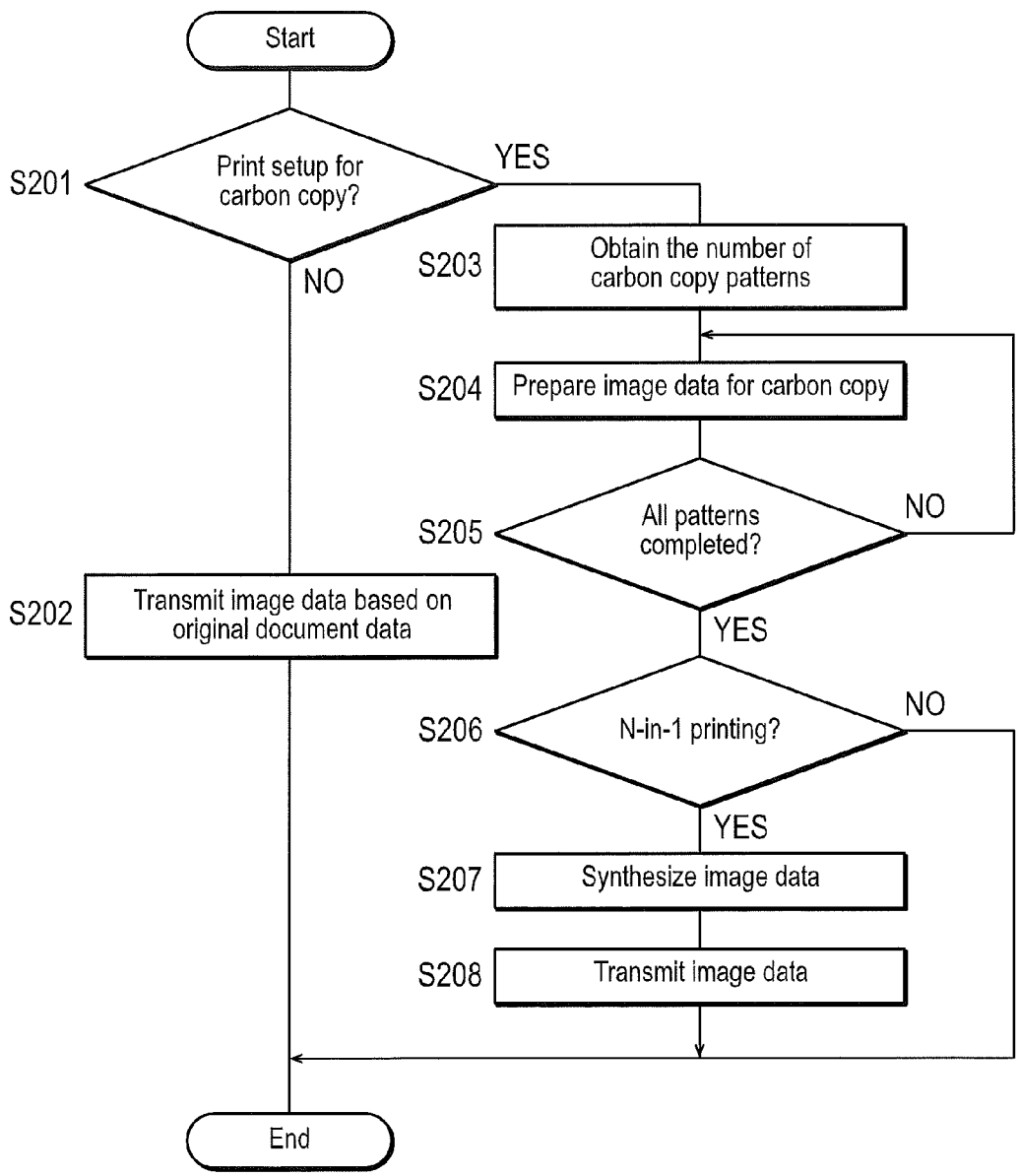
FIG. 13 is a flowchart showing a preparation procedure of forming image data for printing according to the present embodiment.
Figure 15:
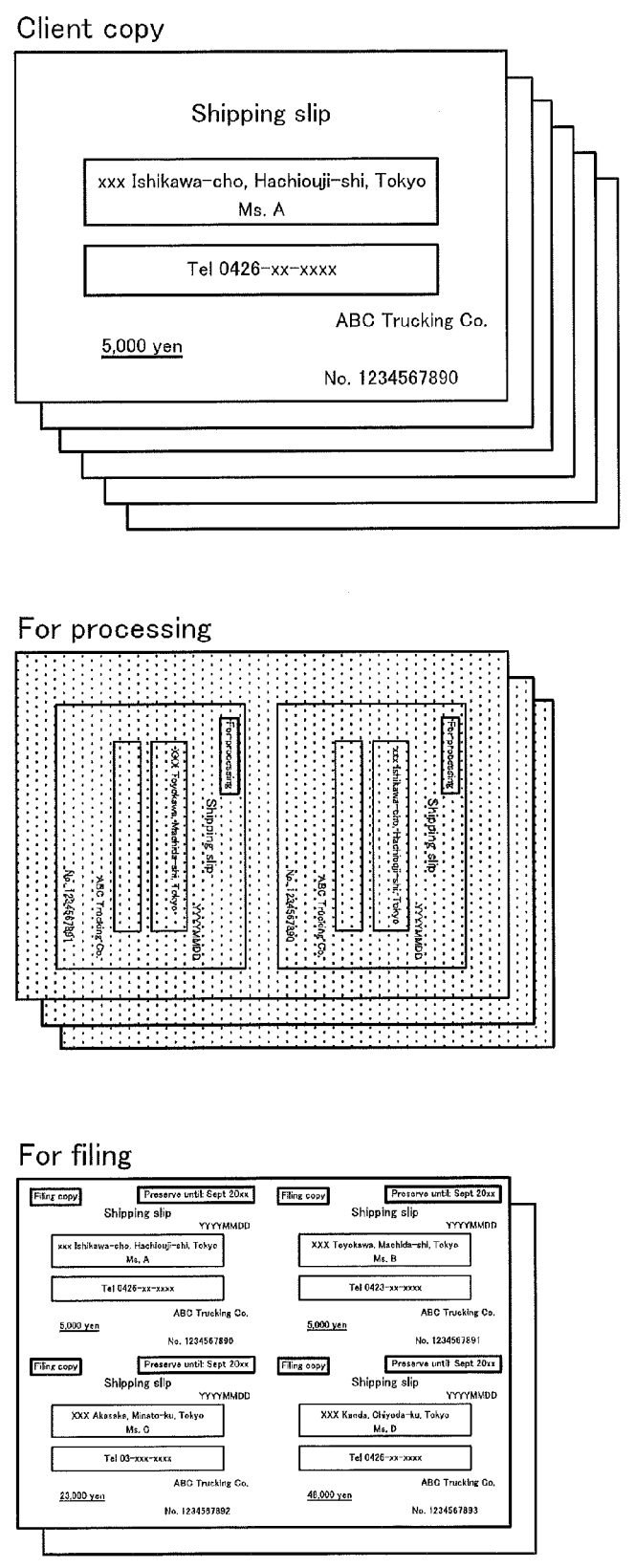

FIG. 13 is a flowchart showing a preparation procedure of forming image data for printing, FIG. 14 is a diagram showing a concept of the image data prepared for printing, and FIG. 15 is a diagram showing how the image data prepared for printing is further synthesized. The algorithm shown in the flowchart of FIG. 13 is stored as a program in the HDD 103 of the PC 100 and executed by the CPU 101.

Firstly, as shown in FIG. 13, it is determined whether carbon copy printing is set up or not (step S201). Here, the lookup table for the print job shown in FIG. 12 is referenced. If the item "Carbon Copy" is set to 'Yes,' it is determined that it is a carbon copy printing, while it is determined that it is not a carbon copy printing job if it is set to 'No.'

If it is not a carbon copy printing (step S201: No), the image data based on the original document data is transmitted to the image forming unit 250 of the MFP 200 together with the print job (step S202).

On the other hand, if the carbon copy printing is set up (step S201: Yes), the number of carbon copy patterns of the print job being processed is obtained from the lookup table (step S203). Here, the number of carbon copy patterns is obtained by counting the number of rows of settings for the print job being processed in the lookup table.

Next, the image data for the carbon copy is prepared (step S204). Firstly, the image data for the carbon copy is prepared from the original document data according to the setting of the leading carbon copy pattern of the currently processed print job in the lookup table. The image data for the carbon copy is the image data for forming an image to which the process set on the above-mentioned setup screen in FIGS. 7 through 9 described above was applied (the image displayed on the preview screen). Then, the image data prepared is stored into the memory 102 or the HDD 103.

Next, it is determined whether the image data for the carbon copy is completed for all the carbon copy patterns or not (step S205). If the preparation of the image data for the carbon copy is not completed for all the carbon copy patterns (step S205: No), the procedure returns to the process of step S204, and the image data for carbon copy is prepared for the next carbon copy pattern. The process of step S204 and S205 is repeated until the preparation of the image data for the carbon copy is completed for all the carbon copy patterns.

If the image data for the carbon copy is completed for all kinds of the carbon copies (step S205: Yes), the program advances to the process of step S206. Here, if the image data for all kinds of carbon copies is completed for the print job "0003" shown in FIG. 12 for example, it means that three kinds of the image data each with different purposes are derived from the original document data as conceptually shown in FIG. 14. If the original image data includes image data corresponding to six pages of the original documents, image data for carbon copies are prepared by 6×3=18 pages in order to provide three kinds of carbon copies each with different purposes for each document. The "purpose" here means, for example, the filing copy for the client, the copy to be used for document processing, or the filing copy for a record, etc.

The image data prepared here reflect the carbon copies set through various setup screens shown in FIGS. 7 through 9. For example, as shown in FIG. 14, the image data of the "For Client" carbon copy contains all kinds of the desired printing data such as destination address and telephone number. Also, the image data of the "For Processing" carbon copy may be prepared by masking the telephone number and the amount of money, adding the printing data "For Processing" (watermark), and modifying the background color to blue. Moreover, the image data of the "For Filing" carbon copy is added with the "Filing" and "Preservation Period."

Next, the lookup table is referenced again here to determine whether the N-in-1 printing is set up or not for the image data prepared for the carbon copy (step S206). If the N-in-1 printing is set up (step S206: Yes), the image data for the carbon copy is synthesized in accordance with the contents of the N-in-1 printing (step S207). For example, 2-up is set up for the Carbon Copy Pattern 2 (second from the top) for the print job "0003" shown in FIG. 12. In this case, the image data is formed by synthesizing the images of two carbon copies on one side of a page as shown in the middle of FIG. 15. As shown in FIG. 14, image data of carbon copies for six pages were originally prepared for one kind (purpose) of the carbon copy. However, in the process of step S207, the image data are synthesized according to the 2-up setting to form the image data in three pages, i.e., one half of the six pages. Similarly, in the Carbon Copy Pattern 3 in which the 4-up is set up, the image data is formed on one side of a page by synthesizing the images of the four carbon copies as shown in the bottom of FIG. 15. The image data for two pages (more exactly one page and a half of another page) is formed from the image data of the original six pages.

Then, the image data prepared for printing is transmitted to the MFP 200 together with the print job (step S208).

Next, the procedure for printing based on the image data transmitted to the MFP 200 as described above will be described below.

Figure 16:
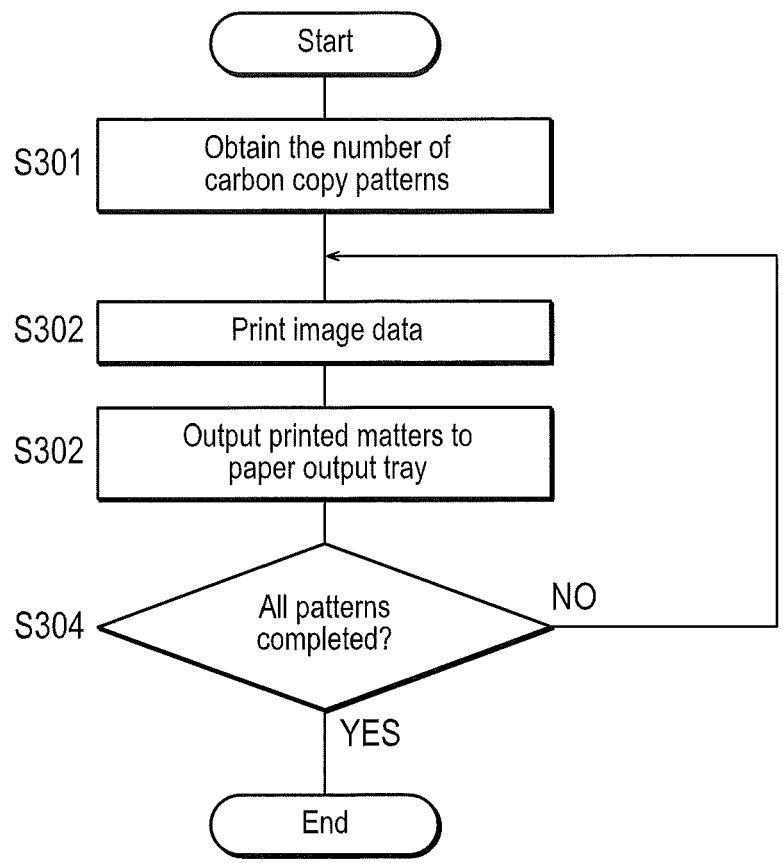
FIG. 16 is a flowchart showing the sequence of the printing process according to the present embodiment.
Figure 17:
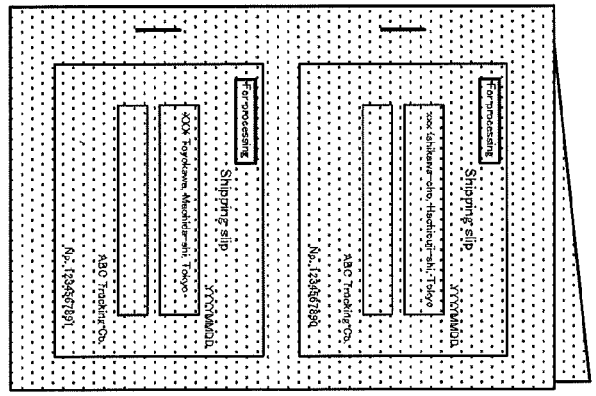
FIG. 17 is a diagram showing examples of printed matters.

FIG. 16 is a flowchart showing the sequence of the printing process according to the present embodiment, and FIG. 17 is a diagram showing an example of a printed matter. The algorithm shown in the flowchart of FIG. 16 is stored as a program in the HDD 204 of the MFP 200 and executed by the CPU 202. Also, the case in which image data for a carbon copy is printed is described in FIG. 16. The case of printing image data other than for carbon copies is omitted.

First, the print job is referenced and the number of carbon copy patterns is obtained (step S301). The carbon copy is then printed based on the image data (step S302). If there exist a plurality of carbon copies, firstly printing for the print job is performed based on the leading carbon copy. For example, in the print job "0003" shown in FIG. 12, printing starts with the carbon copy of the carbon copy pattern 1 (the top row). If the Duplex printing is specified as in the case of the Carbon Copy Pattern 2 (second from the top) of the print job "0003," the MFP 200 forms images on both sides of a sheet of paper.

The carbon copy printed matter thus prepared is output into the paper output tray of the paper output unit 260 specified in the print job (step S303). If finishing processes such as stapling and punching are set up in outputting the paper, these processes are executed as specified.

The printing matters thus completed are formed independently, for example, according to the kind of three different carbon copies, i.e., "For Client," "For Processing," and "For Filing" as shown in FIG. 17. The printed matters shown in FIG. 17 are a case where printing is performed based on the print job "0003" shown in FIG. 12 and the image data shown in FIG. 15. The Duplex printing is set up in the Carbon Copy Pattern 2 of the print job "0003." Therefore, the three page portions of image data of the "For Process" carbon copy shown in FIG. 15 are printed on both sides of a single sheet of paper and on one side of another sheet of paper as shown in the "For Process" carbon copy of FIG. 17. A printed matter comprising a total of two sheets of paper is formed here. Furthermore, since the stapling process is set up in the Carbon Copy Pattern 2, the left edge of the "For Process" carbon copy shown in FIG. 17 is stapled.

It is determined whether the carbon copies are printed for all kinds of carbon copy patterns or not (step S304).

If the carbon copies of all kinds are not completed (step S304: No), the program returns to the process of step S302, and the carbon copy is prepared for the next carbon copy pattern. The process of step S302 and S303 is repeated until all kinds of carbon copies are completed.

When the carbon copies of all kinds are completed (step S304: Yes), the MFP 200 terminates the printing process.

As described above, in the present embodiment, the printer driver performing as the image data preparation unit prepares image data of a plurality of kinds of carbon copy patterns depending on the purposes of the image data derived from the document data. Moreover, the printer driver performing as the image synthesis instructing unit instructs images on one sheet of paper to be synthesized based on multiple page portions of image data through at least either the N-in-1 printing or the Duplex printing for at least one kind ("For Processing" and "For Filing) of the prepared images. Consequently, the MFP 200 can reduce the number of sheets of paper to be output as the image forming unit to contribute to the resource saving.

In particular, if the N-in-1 printing is set up, the printer driver performing as the image data preparation unit forms the image data for printing by synthesizing a plurality page portions of carbon copy images. Thus, the number of image data, in which processes such as rasterization are applied in printing, can be reduced. Therefore the data transferring and processing time can also be reduced, so that a more comfortable printing environment can be achieved.

Alternatively, if the Duplex printing is set up, the MFP 200 synthesizes the image data and forms the image for printing on both sides of paper as the image forming unit.

In the above embodiment, the procedure for preparing the image data for printing in the flow chart shown in FIG. 13 was described as an example executed by the PC 100. However, the invention is not limited to it. The preparation of the image data for printing shown in FIG. 13 can also be executed by the MFP 200. In such a case, the algorithm for such process is stored in the HDD 204 of the MFP 200 as a program and executed by the CPU 202.

Moreover, the print job can be so constituted in such a way as to make it possible to add, delete, or modify the setting via the operation unit 230 immediately before the execution of printing after the image data for carbon copy is transmitted to the MFP 200.

Although the setup information set for carbon copying was described above using specific examples in the above embodiment, the present invention should not be construed to be limited by the setup items described above so that it can be constituted so as to be able to set up other items. The setup screen for setting the setup information is naturally not limited to the above format. Although it was described above that the setup information is to be stored in a lookup table as shown in FIG. 12, the setup information can be written and stored in a different format.

The means and method of conducting various processes in the printing system according to the present embodiment can be achieved by means of a dedicated hardware circuit, or a programmed computer. Said program can be provided either by a nontransitory computer readable recording medium such as a flexible disk and a CD-ROM, or by being supplied on-line via a network such as the Internet. In this case, the program recorded on the nontransitory computer readable recording medium is ordinarily transferred to and stored in a storage unit such as a hard disk. Said program can also be provided as independent application software or can be built into the software of a printing system as a part of its function.

What is claimed is:

1. A data processing system comprising:
an image data preparation unit that prepares a plurality of carbon copy image data derived from document data, each of the plurality of carbon copy image data being prepared for a respective one of various purposes of said document data;
an image synthesis instructing unit that instructs images to be synthesized based on said plurality of carbon copy image data, at least one of the synthesized images comprising a plurality of portions of the plurality of carbon copy image data onto one sheet of paper;
wherein the image data preparation unit prepares all of the carbon copy image data before the image synthesis instructing unit instructs images to be synthesized; and
wherein said image synthesis instructing unit is instructed to synthesize said image comprising a plurality of page portions for one of the various purposes of said document data onto one side or at least one of two sides of a single page.

2. The data processing system as claimed in claim 1, wherein said image synthesis instructing unit instructs said image data preparation unit to prepare synthetic image data synthesized from a plurality of images onto one side of said single page.

3. The data processing system as claimed in claim 1 further comprising:
an image forming unit that forms an image on paper, wherein
said image synthesis instructing unit instructs said image forming unit to form images based on said plurality of carbon copy image data comprising a plurality of portions onto a single page of a sheet of paper;
wherein the image forming unit continuously forms images based on all of the carbon copy image data in response to the image synthesis instructing unit instruction.

4. The data processing system as claimed in claim 1, wherein
said image data preparation unit prepares said plurality of carbon copy image data depending on purposes of said document data by at least one process among the processes of adding or deleting texts, masking a portion, modifying the background color, and synthesizing other image data.

5. A data processing system comprising:
an image data preparation unit that prepares various kinds of image data deriving from document data depending on various purposes of said document data;
an image synthesis instructing unit that instructs images to be synthesized based on said image data comprising a plurality of page portions onto one sheet of paper for at least one kind of image data prepared by said image data preparation unit from said various kinds of document data;
wherein said image synthesis instructing unit instructs to synthesize said image comprising a plurality of page portions of the same kind onto one side or at least one of two sides of a single page; and
wherein said image synthesis instructing unit instructs said image data preparation unit to prepare synthetic image data synthesized from a plurality of images of the same kind onto one side of said single page.

6. A data processing method comprising:
a step of preparing a plurality of carbon copy image data derived from document data, each of the plurality of carbon copy image data being prepared for a respective one of various purposes of said document data;
a step of instructing images to be synthesized based on said plurality of carbon copy image data, at least one of the synthesized images comprising a plurality of portions of the plurality of carbon copy image data onto one sheet of paper;
wherein all of the carbon copy image data is prepared before the step of instructing images to be synthesized based on the carbon copy image data is executed; and wherein the synthesized images comprise a plurality of page portions for one of the various purposes of said document data onto one side or at least one of two sides of a single page.

7. An image forming apparatus, comprising:

an image data preparation unit that prepares a plurality of carbon copy image data derived from document data, each of the plurality of carbon copy image data being prepared for a respective one of various purposes of said document data;

an image synthesis instructing unit that instructs images to be synthesized based on said plurality of carbon copy image data, at least one of the synthesized images comprising a plurality of portions of the plurality of carbon copy image data onto one sheet of paper;

a printing unit that prints out images based on said plurality of carbon copy image data synthesized according to the instruction of said image synthesis instructing unit;

wherein the image data preparation unit prepares all of the carbon copy image data before the image synthesis instructing unit instructs images to be synthesized;

wherein the printing unit continuously prints the images based on all of the carbon copy image data in response to the image synthesis instructing unit instruction; and wherein said image synthesis instructing unit is instructed to synthesize said image comprising a plurality of page portions for one of the various purposes of said document data onto one side or at least one of two sides of a single page.

* * * * *